(12) United States Patent
Li et al.

(10) Patent No.: US 9,596,260 B2
(45) Date of Patent: Mar. 14, 2017

(54) METHOD AND APPARATUS FOR UPLOADING FILES

(71) Applicant: Tencent Technology (Shenzhen) Company Limited, Shenzhen (CN)

(72) Inventors: Linfeng Li, Shenzhen (CN); Ling Guo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 31 days.

(21) Appl. No.: 14/637,346

(22) Filed: Mar. 3, 2015

(65) Prior Publication Data

US 2015/0264060 A1    Sep. 17, 2015

Related U.S. Application Data

(63) Continuation of application No. PCT/CN2013/082625, filed on Aug. 30, 2013.

(30) Foreign Application Priority Data

Sep. 3, 2012 (CN) .......................... 2012 1 0321486

(51) Int. Cl.
H04L 29/06 (2006.01)
H04L 29/08 (2006.01)

(52) U.S. Cl.
CPC ........ H04L 63/145 (2013.01); H04L 63/0218 (2013.01); H04L 63/1433 (2013.01); H04L 67/06 (2013.01)

(58) Field of Classification Search
CPC combination set(s) only.
See application file for complete search history.

(56) References Cited

U.S. PATENT DOCUMENTS 6,330,547 B1 *  12/2001  Martin ................. G06Q 40/025
                                                        705/38
2004/0153650 A1 *  8/2004  Hillmer ................. G06F 21/64
                                                        713/176

(Continued)

FOREIGN PATENT DOCUMENTS

CN    101039177 A     9/2007
CN    101308533 A    11/2008

(Continued)

OTHER PUBLICATIONS

International Search Report for corresponding PCT Application No. PCT/CN2013/082625, filed Aug. 30, 2013.

*Primary Examiner* — Taghi Arani
*Assistant Examiner* — Phy Anh Vu
(74) *Attorney, Agent, or Firm* — Anova Law Group, PLLC

(57) ABSTRACT

A method and apparatus for uploading files are disclosed. The method includes: upon receiving a scanning instruction, obtaining unknown files on a client and putting the unknown files in a file upload queue; scanning unknown files in the file upload queue to obtain a risk coefficient for each unknown file; sorting in descending order the unknown files in the file upload queue based on the risk coefficient of the unknown files; and uploading the unknown files in the file upload queue in order to a server. The unknown files in the file upload queue are sorted so that the most suspicious files are uploaded first to ensure that the server will timely receive the most suspicious files, which greatly improves the efficiency of cloud servers in collecting suspicious files.

14 Claims, 4 Drawing Sheets

(56) References Cited

U.S. PATENT DOCUMENTS

| | | | |
|---|---|---|---|
| 2006/0136784 A1* | 6/2006 | Prescott | G06F 11/0748 |
| | | | 714/38.11 |
| 2006/0206935 A1* | 9/2006 | Choi | G06F 21/55 |
| | | | 726/22 |
| 2006/0218145 A1* | 9/2006 | Butcher | G06F 21/50 |
| 2013/0191919 A1* | 7/2013 | Basavapatna | G06F 21/577 |
| | | | 726/25 |
| 2013/0247205 A1* | 9/2013 | Schrecker | G06F 21/577 |
| | | | 726/25 |
| 2013/0276121 A1* | 10/2013 | Thomas | G06F 21/56 |
| | | | 726/24 |
| 2014/0259170 A1* | 9/2014 | Amsler | H04L 63/20 |
| | | | 726/23 |

FOREIGN PATENT DOCUMENTS

| CN | 101833575 A | 9/2010 |
|---|---|---|
| CN | 102611757 A | 7/2012 |
| JP | 2006120024 A | 5/2006 |

* cited by examiner

METHOD AND APPARATUS FOR UPLOADING FILES

CROSS-REFERENCE TO RELATED APPLICATIONS

This application is a continuation of International Patent Application No. PCT/CN2013/082625, entitled "Method and Apparatus for Uploading Files," filed on Aug. 30, 2013. This application claims the benefit and priority of Chinese Patent Application No. 201210321486.X, entitled "Method and Apparatus for Uploading Files," filed on Sep. 3, 2012. The entire disclosures of each of the above applications are incorporated herein by reference.

TECHNICAL FIELD

The present invention relates to securities technologies, and more particularly to methods and apparatuses for uploading files.

BACKGROUND

Computer viruses are rapidly evolving and becoming more and more complex and diversified, with large number of new viruses emerging every day, while relatively speaking, security software is lagging behind. Thus, it is vital for security software to quickly collect and analyze the latest viruses to timely provide a high level of protection for user's computers.

Currently, the security software installed on the client monitors suspicious software activities on the network. When the security software on the client scans an unknown file, it uploads the unknown file to a cloud server; the cloud server will automatically analyze and process the unknown file to obtain the latest information on Trojans and malware on the Internet, and then distribute anti-virus solutions to the clients.

In scanning an unknown file, the current security software on the client does not know whether the unknown file is a suspicious file, but simply put the unknown file at the end of a file upload queue to be uploaded. Some security software limits the number of files to be uploaded, and if the file upload queue is full, then a suspicious file might not be able to be put into the queue. Also, the suspicious file might have entered the file upload queue, but might not be able to be uploaded while the files ahead of the suspicious file are uploaded, possibly due to user operation. Moreover, there could only be one suspicious file among a large number of unsuspicious files, and the suspicious file might not be uploaded, while a large number of unsuspicious files are uploaded. Thus, the upload mechanism of security software may present some of the newest viruses or other dangerous files from being uploaded to the cloud server and being timely detected or removed by the security software, which degrades the efficiency of cloud servers in collecting suspicious files and impairs the security of computer systems.

SUMMARY OF THE INVENTION

To increase the efficiency of cloud servers in collecting suspicious files, the embodiments of the present invention provide a method and apparatus for uploading files.

In accordance with one expect of the present invention, a method for uploading files is provided, the method comprising: upon receiving a scanning instruction, obtaining unknown files on a client and putting the unknown files in a file upload queue; scanning unknown files in the file upload queue to obtain a risk coefficient for each unknown file; sorting in descending order the unknown files in the file upload queue based on the risk coefficient of the unknown files; and uploading the unknown files in the file upload queue in order to a server.

Preferably, the method further comprises, prior to putting the unknown files in a file upload queue, constructing the file upload queue based on the number of unknown files, wherein the file upload queue is configured to store unknown files to be uploaded to the server.

Preferably, putting the unknown files in a file upload queue comprises obtaining attribute information of each unknown file, uploading attribute information of each unknown file to the server, and causing the server to determine whether there exist a file that matches the attribute information of each unknown file and to return a danger signal if such file exists, and a nonexistence signal if such file does not exist; upon receiving the danger signal from the server, removing the unknown file corresponding to the danger signal; and upon receiving a nonexistence signal from the server, putting the unknown file not found by the server in the file upload queue.

Preferably, scanning unknown files in the file upload queue to obtain a risk coefficient for each unknown file comprises: calling a virus identification unit of the client; scanning each unknown file in the file upload queue using the virus identification unit to obtain the suspicious coefficient for each unknown file; and aggregating the suspicious coefficient for each unknown file to obtain the risk coefficient for each unknown file.

Preferably, the method further comprises, after uploading the unknown files in the file upload queue in order to a server, receiving an upload result returned from the server; and, when the upload result indicates an upload failure, displaying a manual upload interface for receiving a selection made by an end-user at the manual upload interface to upload the unknown file that failed to upload to the server.

Preferably, the method further comprises, prior to uploading the unknown files in the file upload queue in order to a server, detecting the current network status; upon detecting that the current network status is abnormal, stopping uploading the unknown files in the file upload queue; and upon detecting that the current network status is normal, executing the step of uploading the unknown files in the file upload queue in order to a server.

In accordance with one expect of the present invention, an apparatus for uploading files is provided, the apparatus comprising: an insertion module for upon receiving a scanning instruction, obtaining unknown files on a client and putting the unknown files in a file upload queue; a risk assessment module for scanning unknown files in the file upload queue to obtain a risk coefficient for each unknown file; a sorting module for sorting in descending order the unknown files in the file upload queue based on the risk coefficient of the unknown files; and an uploading module for uploading the unknown files in the file upload queue in order to a server.

Preferably, the apparatus further comprises a construction module for, prior to putting the unknown files in a file upload queue, constructing the file upload queue based on the number of unknown files, wherein the file upload queue is configured to store unknown files to be uploaded to the server.

Preferably, the insertion module comprises an uploading unit for obtaining attribute information of each unknown file, uploading attribute information of each unknown file to the server, and causing the server to determine whether there exist a file that matches the attribute information of each unknown file and to return a danger signal if such file exists, and a nonexistence signal if such file does not exist; an antivirus unit for, upon receiving the danger signal from the server, removing the unknown file corresponding to the danger signal; and an insertion unit, for upon receiving a nonexistence signal from the server, putting the unknown file not found by the server in the file upload queue.

Preferably, the risk assessment module comprises: a calling unit for calling a virus identification unit of the client; a suspicious coefficient acquisition unit for scanning each unknown file in the file upload queue using the virus identification unit to obtain the suspicious coefficient for each unknown file; and a risk coefficient acquisition unit for aggregating the suspicious coefficient for each unknown file to obtain the risk coefficient for each unknown file.

Preferably, the apparatus further comprises an output module for, after uploading the unknown files in the file upload queue in order to a server, receiving an upload result returned from the server; and, when the upload result indicates an upload failure, displaying a manual upload interface for receiving a selection made by an end-user at the manual upload interface to upload the unknown file that failed to upload to the server.

Preferably, the apparatus further comprises a network detecting module for, prior to uploading the unknown files in the file upload queue in order to a server, detecting the current network status; upon detecting that the current network status is abnormal, stopping uploading the unknown files in the file upload queue; and upon detecting that the current network status is normal, executing the step of uploading the unknown files in the file upload queue in order to a server.

In accordance with embodiments of the present invention, upon receiving a scanning instruction, the unknown files on a client are obtained, and put in a file upload queue; each unknown file in the file upload queue is scanned to obtain a risk coefficient for each unknown file; the unknown files in the file upload queue are sorted in descending order based on the risk coefficient of the unknown files; and the unknown files in the file upload queue are uploaded in order to a server. The risk coefficient of the unknown files are obtained, and the unknown files in the file upload queue are sorted so that the most suspicious files are uploaded first to ensure that the server will timely receive the most suspicious files, which greatly improves the efficiency of cloud servers in collecting suspicious files and timely detecting new viruses or Trojans.

BRIEF DESCRIPTION OF THE DRAWINGS

To better illustrate the technical features of the embodiments of the present invention, various embodiments of the present invention will be briefly described in conjunction with the accompanying drawings. It is obvious that the draws are but for exemplary embodiments of the present invention, and that a person of ordinary skill in the art may derive additional draws without deviating from the principles of the present invention.

DESCRIPTION OF THE PREFERRED EMBODIMENTS

To better illustrate the purpose, technical feature, and advantages of the embodiments of the present invention, various embodiments of the present invention will be further described in conjunction with the accompanying drawings.

Embodiment One

Figure 1:
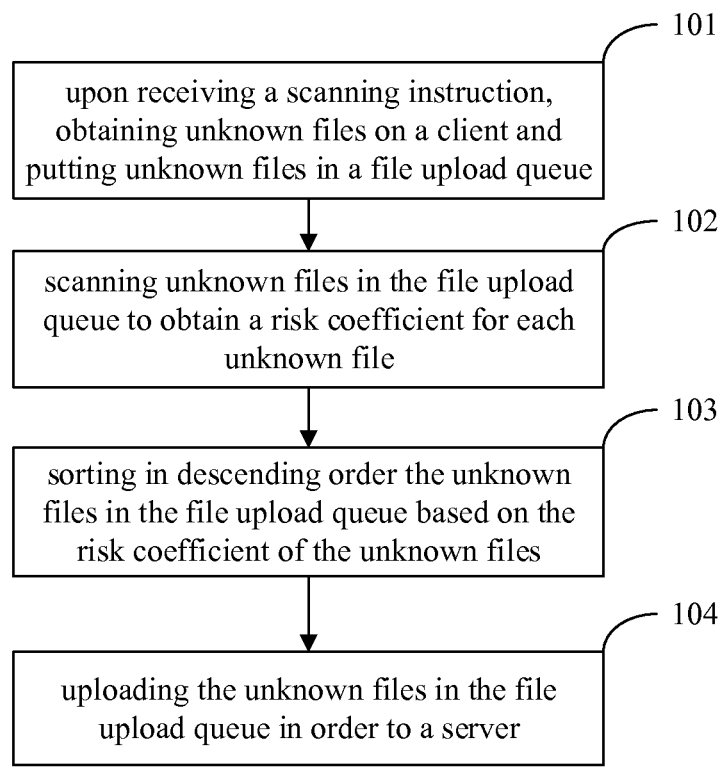
FIG. 1 is an exemplary flowchart for a method for uploading files in accordance with a first embodiment of the present invention.

As shown in FIG. 1, in accordance with this embodiment, a method for uploading files is provided, the method comprising:

Step 101: upon receiving a scanning instruction, obtaining unknown files on a client and putting the unknown files in a file upload queue.

Step 102: scanning unknown files in the file upload queue to obtain a risk coefficient for each unknown file.

Step 103: sorting in descending order the unknown files in the file upload queue based on the risk coefficient of the unknown files.

Step 104: uploading the unknown files in the file upload queue in order to a server.

Preferably, the method further comprises, prior to putting the unknown files in a file upload queue, constructing the file upload queue based on the number of the unknown files, wherein the file upload queue is configured to store unknown files to be uploaded to the server.

Preferably, putting the unknown files in a file upload queue comprises obtaining attribute information of each unknown file, uploading attribute information of each unknown file to the server, and causing the server to determine whether there exist a file that matches the attribute information of each unknown file and to return a danger signal if such file exists, and a nonexistence signal if such file does not exist; upon receiving the danger signal from the server, removing the unknown file corresponding to the danger signal; and upon receiving a nonexistence signal from the server, putting the unknown file not found by the server in the file upload queue.

Preferably, scanning unknown files in the file upload queue to obtain a risk coefficient for each unknown file comprises: calling a virus identification unit of the client; scanning each unknown file in the file upload queue using the virus identification unit to obtain the suspicious coefficient for each unknown file; and aggregating the suspicious coefficient for each unknown file to obtain the risk coefficient for each unknown file.

Preferably, the method further comprises, after uploading the unknown files in the file upload queue in order to a server, receiving an upload result returned from the server; and, when the upload result indicates an upload failure, displaying a manual upload interface for receiving a selection made by an end-user at the manual upload interface to upload the unknown file that failed to upload to the server.

Preferably, the method further comprises, prior to uploading the unknown files in the file upload queue in order to a server, detecting the current network status; upon detecting that the current network status is abnormal, stopping uploading the unknown files in the file upload queue; and upon detecting that the current network status is normal, executing the step of uploading the unknown files in the file upload queue in order to a server.

In accordance with this embodiment, upon receiving a scanning instruction, the unknown files on a client are obtained, and put in a file upload queue; each unknown file in the file upload queue is scanned to obtain a risk coefficient for each unknown file; the unknown files in the file upload queue are sorted in descending order based on the risk coefficient of the unknown files; and the unknown files in the file upload queue are uploaded in order to a server. The risk coefficient of the unknown files are obtained, and the unknown files in the file upload queue are sorted so that the most suspicious files are uploaded first to ensure that the server will timely receive the most suspicious files, which greatly improves the efficiency of cloud servers in collecting suspicious files and timely detecting new viruses or Trojans.

Embodiment Two

In accordance with this embodiment, a method for uploading files is provided. Also in accordance with this embodiment, preset security software is provided, and the present security software is installed at a client. When the preset security software scans the files on the client, the unknown files on the client are assessed with a risk coefficient, sorted based on the risk coefficient; and uploaded in order to a server. The client in this embodiment may refer to, a client terminal device, which includes but is not limited to, a desktop computer, a laptop, a netbook, a tablet, a mobile phone, a multimedia TV and other electronic equipment, or a client side application program; and is not limited to any specific embodiment.

Figure 2:
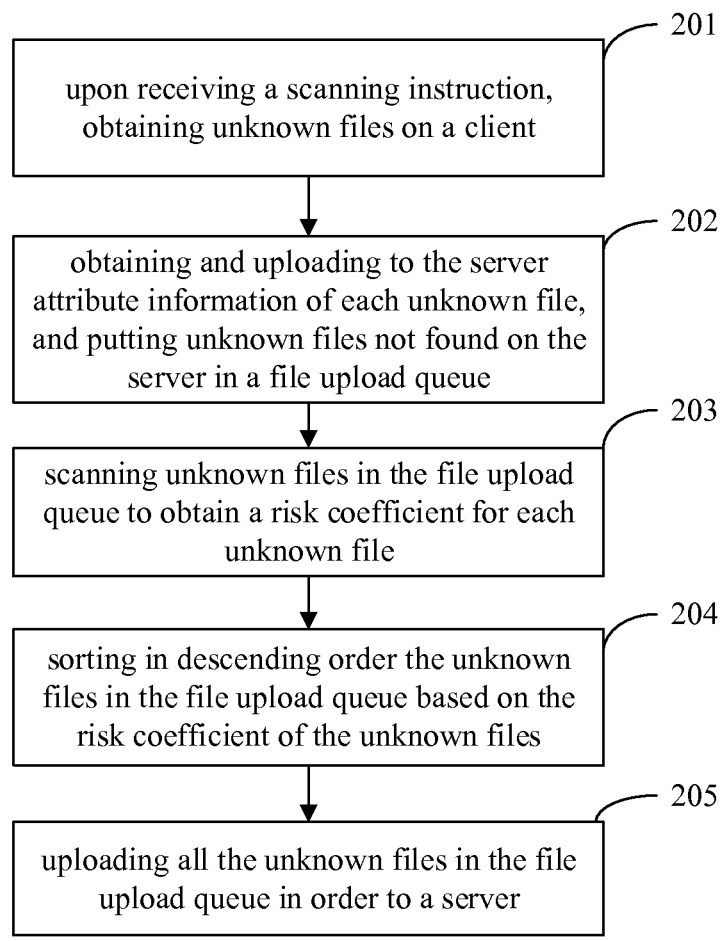
FIG. 2 is an exemplary flowchart for a method for uploading files in accordance with a second embodiment of the present invention.

As shown in FIG. 2, in accordance with this embodiment, the method for uploading files comprises:

Step 201: upon receiving a scanning instruction, obtaining unknown files on a client.

In this embodiment, when the preset security software detects unknown files on the client, a user interface is outputted on the client prompting the user to initiate security scanning, or the user can take the initiative to start the preset security software to scan the client. Here, the unknown files refer to files that the security software cannot identify. The method comprises, upon receiving the scanning instruction, obtaining unknown files on a client that need to be scanned.

In this embodiment, preferably, the method comprises, after obtaining the unknown files on the client, constructing the file upload queue based on the number of unknown files, wherein the file upload queue is configured to store unknown files to be uploaded to the server. The number of the unknown files obtained on the client can be counted using conventional techniques, such as system tools available from the operation system. Alternatively, the file upload queue can be preset in the preset security software.

Step 202: obtaining attribute information of each unknown file, uploading attribute information of each unknown file to the server, and putting the unknown files not found by the server in a file upload queue.

In this embodiment, the present security software performs a preliminary filtering of the unknown files. The filtering comprises obtaining attribute information of each unknown file, uploading attribute information of each unknown file to the server to determine whether the unknown files exist on the server. The attribute information of the unknown files may include file directory, md5 value, the file created time, etc.

In this step, after the server receives the attributes information of the unknown file, the server is searched to determine whether there exists a file that matches the attribute information of the unknown file. If such file exists, it means that the server has already processed this file, and a danger signal is returned for this unknown file; when the client receives the danger signal returned from the server, it does not need to put the unknown file in the file upload queue, and can directly remove the unknown file corresponding to the danger signal.

If the server does not find a file that matches the attribute information of the unknown file, it means that the server has not processed this file, and a nonexistence signal is returned for this unknown file; when the client receives the nonexistence signal returned from the server, it puts the unknown file in the file upload queue, and proceeds to step 204.

It should be noted that steps 202 and 203 are optional. The attribute information of the unknown file can be uploaded to the server to determine whether the unknown file exists on the server, and the unknown file is put in the file upload queue if it was not found by the server. Alternatively, all the unknown files can be directly put in the file upload queue.

Step 203: scanning unknown files in the file upload queue to obtain a risk coefficient for each unknown file.

In this step, the unknown files in the file upload queue are pre-processed, i.e., scanned to obtain a risk coefficient for each unknown file. Preferably, scanning unknown files in the file upload queue to obtain a risk coefficient for each unknown file comprises: calling a virus identification unit of the client; scanning each unknown file in the file upload queue using the virus identification unit to obtain the suspicious coefficient for each unknown file; and aggregating the suspicious coefficient for each unknown file to obtain the risk coefficient for each unknown file. The virus identification unit of the client comprises other security software on the client, and is not limited to any specific software. For example, there might be three virus identification units installed on the client, and the preset security software calls the three virus identification units to scan each unknown file, and aggregates the scanning results of each virus identification unit to obtain the risk coefficient of each unknown file.

TABLE 1

|  | Virus Identification Unit 1 | Virus Identification Unit 2 | Virus Identification Unit 3 |
| --- | --- | --- | --- |
| Identification Capability | 10 | 6 | 5 |

|  | Suspicious Coefficient | Suspicious Coefficient | Suspicious Coefficient | Risk Coefficient |
| --- | --- | --- | --- | --- |
| File 1 | 6 | 4 | 3 | 13 |
| File 2 | 5 | 2 | 4 | 11 |
| File 3 | 7 | 5 | 3 | 15 |
| File 4 | 2 | 1 | 1 | 4 |
| File 5 | 4 | 3 | 0 | 7 |
| File 6 | 6 | 2 | 3 | 11 |
| File 7 | 4 | 4 | 1 | 9 |
| File 8 | 3 | 2 | 1 | 6 |

As shown in Table 1, the virus identification unit 1 scans file 1 and obtains a suspicious coefficient of 6; the virus identification unit 2 scans file 1 and obtains a suspicious coefficient of 4; the virus identification unit 3 scans file 1 and obtains a suspicious coefficient of 3; and the scanning results of the three virus identification units are aggregated to obtain a risk coefficient of 13 for file 1. In Table 1, the identification capability refers to the ability of the virus identification unit to identify virus. The virus identification units with stronger identification capability can be called to scan the client, or alternative, all the virus identification units can be called to scan the client.

In this embodiment, the prior art can be referenced for the scanning method by the virus identification units.

Step 204: sorting in descending order the unknown files in the file upload queue based on the risk coefficient of the unknown files.

In this step, after obtaining the risk coefficient of each unknown file, all the unknown files are sorted in descending order based on the risk coefficient of the unknown files. For example, after obtaining the risk coefficient of each unknown file in Table 1, all the unknown files are re-sorted so that unknown files with higher risk coefficient are put in the front of the queue, and unknown files with the same risk coefficient are not sorted randomly. Based on the risk coefficient in Table 1, the resorted unknown files are shown in Table 2.

TABLE 2

| Unknown File |
|---|
| File 3 |
| File 1 |
| File 2 |
| File 6 |
| File 7 |
| File 5 |
| File 8 |
| File 4 |

After sorting the unknown files in the file upload queue, File 3 with the highest risk coefficient is put at the front the queue, followed by File 1, File 2, File 6, File 7, file 5, File 8 and File 4 in descending order based on the risk coefficient. When the files are uploaded, the file with the highest risk coefficient will be the first to be uploaded, which ensures that the most suspicious files are uploaded first.

Step 205: uploading all the unknown files in the file upload queue in order to a server.

In this step, after the completion of the security scanning and sorting of the files in the file upload queue, the unknown files are uploaded based on the order in the file upload queue, which ensures that the most suspicious files are uploaded first, and that the preset security software can timely detect new viruses and Trojans to safeguard the user computer system.

In accordance with this embodiment, the method further comprises, after uploading the unknown files in the file upload queue in order to a server, receiving an upload result returned from the server. If the server successfully receives the uploaded file, the server returns an upload success message; after the client receives the upload success message, the client deletes the unknown file that was successfully uploaded from the file upload queue, and records the upload success event. If the server fails to receive the uploaded file, the server returns an upload failure message; after the client receives the upload failure message, the client deletes the unknown file that failed to upload from the file upload queue, records the upload failure event, and outputs a manual upload interface for receiving a selection made by an end-user at the manual upload interface to upload the unknown file that failed to upload to the server.

Preferably, the method further comprises, prior to uploading the unknown files in the file upload queue in order to a server, detecting the current network status; upon detecting that the current network status is abnormal, stopping uploading the unknown files in the file upload queue; and upon detecting that the current network status is normal, executing the step of uploading the unknown files in the file upload queue in order to a server. Abnormal network status indicates poor network connection, such as no normal communication, network packet loss, and network delay. Normal network status indicates good network connection.

In accordance with this embodiment, upon receiving a scanning instruction, the unknown files on a client are obtained, and put in a file upload queue; each unknown file in the file upload queue is scanned to obtain a risk coefficient for each unknown file; the unknown files in the file upload queue are sorted in descending order based on the risk coefficient of the unknown files; and the unknown files in the file upload queue are uploaded in order to a server. The risk coefficient of the unknown files are obtained, and the unknown files in the file upload queue are sorted so that the most suspicious files are uploaded first to ensure that the server will timely receive the most suspicious files, which greatly improves the efficiency of cloud servers in collecting suspicious files and timely detecting new viruses or Trojans.

Embodiment Three

Figure 3:
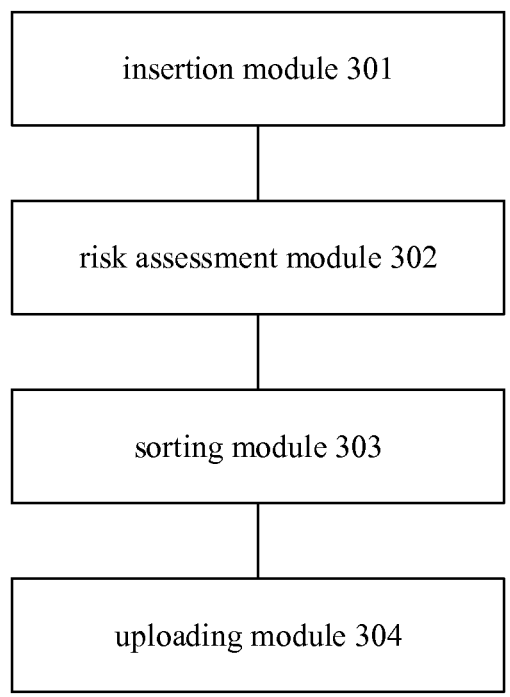
FIG. 3 is an exemplary schematic diagram for an apparatus for uploading files in accordance with a third embodiment of the present invention.

As shown in FIG. 3, in accordance with this embodiment, an apparatus for uploading files is provided, the apparatus comprising an insertion module 301; a risk assessment module 302; a sorting module 303; and an uploading module 304.

The insertion module 301 is configured for, upon receiving a scanning instruction, obtaining unknown files on a client and putting the unknown files in a file upload queue. The risk assessment module 302 is configured for scanning unknown files in the file upload queue to obtain a risk coefficient for each unknown file. The sorting module 303 is configured for sorting in descending order the unknown files in the file upload queue based on the risk coefficient of the unknown files. The uploading module 304 is configured for uploading the unknown files in the file upload queue in order to a server.

Figure 4:
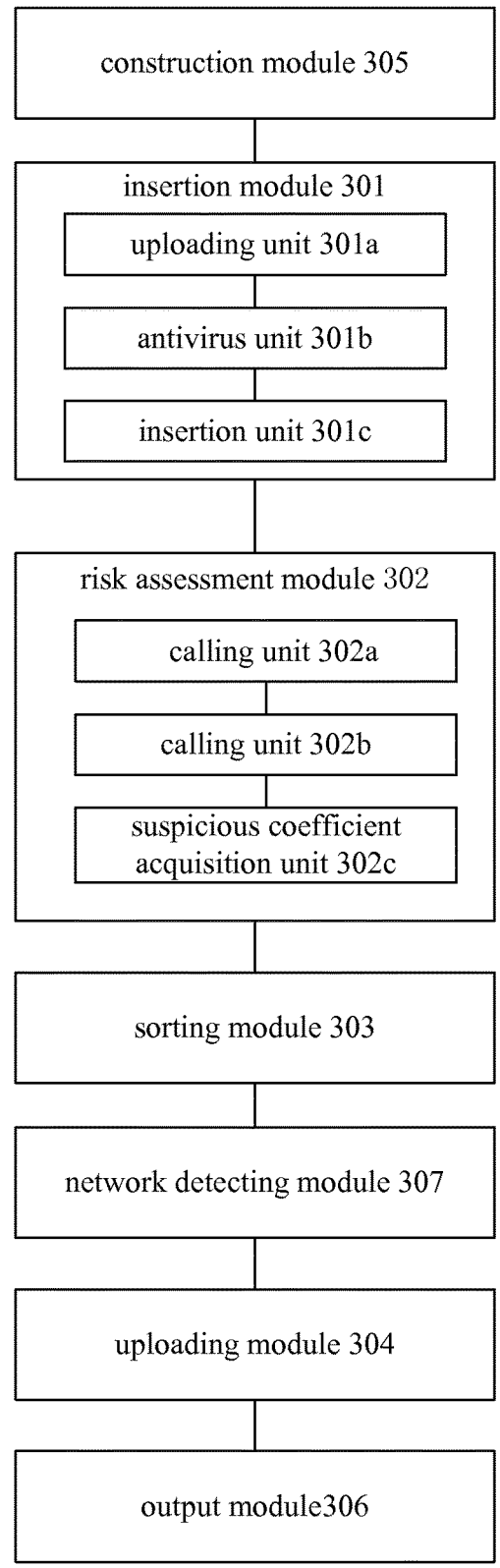
FIG. 4 is an exemplary schematic diagram for another apparatus for uploading files in accordance with the third embodiment of the present invention.

Optionally, as shown in FIG. 4, the apparatus further comprises a construction module 305 for, prior to the insertion module 301 putting the unknown files in a file upload queue, constructing the file upload queue based on the number of unknown files, wherein the file upload queue is configured to store unknown files to be uploaded to the server.

Preferably, as shown in FIG. 4, the insertion module 301 comprises an uploading unit 301a for obtaining attribute information of each unknown file, uploading attribute information of each unknown file to the server, and causing the server to determine whether there exist a file that matches the attribute information of each unknown file and to return a danger signal if such file exists, and a nonexistence signal if such file does not exist; an antivirus unit 301b for, upon receiving the danger signal from the server, removing the unknown file corresponding to the danger signal; and an insertion unit 301c, for upon receiving a nonexistence signal from the server, putting the unknown file not found by the server in the file upload queue.

Preferably, as shown in FIG. 4, the risk assessment module 302 comprises: a calling unit 302a for calling a virus identification unit of the client; a suspicious coefficient acquisition unit 302b for scanning each unknown file in the file upload queue using the virus identification unit to obtain the suspicious coefficient for each unknown file; and a risk coefficient acquisition unit 302c for aggregating the suspicious coefficient for each unknown file to obtain the risk coefficient for each unknown file.

Preferably, as shown in FIG. 4, the apparatus further comprises an output module 306 for, after the uploading module 304 uploading the unknown files in the file upload queue in order to a server, receiving an upload result returned from the server; and, when the upload result indicates an upload failure, displaying a manual upload interface for receiving a selection made by an end-user at the manual upload interface to upload the unknown file that failed to upload to the server.

Preferably, as shown in FIG. 4, the apparatus further comprises a network detecting module 307 for, prior to the uploading module 304 uploading the unknown files in the file upload queue in order to a server, detecting the current network status; upon detecting that the current network status is abnormal, stopping uploading the unknown files in the file upload queue; and upon detecting that the current network status is normal, executing the step of uploading the unknown files in the file upload queue in order to a server.

In accordance with this embodiment, upon receiving a scanning instruction, the unknown files on a client are obtained, and put in a file upload queue; each unknown file in the file upload queue is scanned to obtain a risk coefficient for each unknown file; the unknown files in the file upload queue are sorted in descending order based on the risk coefficient of the unknown files; and the unknown files in the file upload queue are uploaded in order to a server. The risk coefficient of the unknown files are obtained, and the unknown files in the file upload queue are sorted so that the most suspicious files are uploaded first to ensure that the server will timely receive the most suspicious files, which greatly improves the efficiency of cloud servers in collecting suspicious files and timely detecting new viruses or Trojans.

It should be noted that, in the above descriptions, the various modules in the apparatus for uploading files are merely exemplary examples used to illustrate the embodiments of the present invention by way of examples. In practice, the various functions can be allocated to different modules based on need, and the apparatus can be divided into different modules to perform the whole or part of the functions described above. In addition, operational principles of the apparatus for uploading files in accordance with embodiments of the present invention are the same as those of the method for uploading files, and the method embodiments can be referenced for the implementation details of the apparatus embodiments.

The numbering of the embodiments of the present invention is done solely for convenience, and does not represent the comparative merits of the embodiments. Those skilled in the art will understand that all or part of the embodiments of the present invention can be implemented by computer hardware, or by a computer program controlling the relevant hardware. The computer program can be stored in a computer readable storage media, which can be read-only memory, magnetic disk or optical disk, etc.

The various embodiments of the present invention are merely preferred embodiments, and are not intended to limit the scope of the present invention, which includes any modification, equivalent, or improvement that does not depart from the spirit and principles of the present invention.

The invention claimed is:

1. A method for uploading files, the method comprising:
upon receiving a scanning instruction, obtaining unknown files on a client, the client having at least a processor and communication capabilities;
performing a preliminary filtering of the unknown files to obtain a file upload queue, including:
obtaining attribute information of each of the unknown files, uploading only the attribute information of each of the unknown files to a server, and causing the server to determine whether there exists a file that matches the attribute information of each of the unknown files and to return a danger signal if such file exists, and a nonexistence signal if such file does not exist;
upon receiving the danger signal from the server, removing unknown files corresponding to the danger signal from the client and removing the unknown files corresponding to the danger signal from the file upload queue; and
upon receiving a nonexistence signal from the server, putting unknown files corresponding to the nonexistence signal in the file upload queue;
after the preliminary filtering is performed, scanning, by the client, the unknown files corresponding to the nonexistence signal in the file upload queue to obtain a risk coefficient for each of the unknown files corresponding to the nonexistence signal;
sorting, by the client, in descending order the unknown files corresponding to the nonexistence signal in the file upload queue based on the risk coefficient of each of the unknown files; and
uploading, by the client, the sorted unknown files corresponding to the nonexistence signal in the file upload queue in order to the server;
wherein the method further comprises, prior to uploading the sorted unknown files in the file upload queue in order to a server,
detecting a current network status;
upon detecting that the current network status is abnormal, stopping uploading the sorted unknown files corresponding to the nonexistence signal in the file upload queue, wherein abnormal network status indicates poor network connection including at least one of network packet loss and network delay; and
upon detecting that the current network status is normal, executing the step of uploading the sorted unknown files corresponding to the nonexistence signal in the file upload queue in order to a server.

2. The method of claim 1, further comprising, prior to obtaining the file upload queue,
constructing the file upload queue based on a number of the unknown files, wherein the file upload queue is configured to store unknown files to be uploaded to the server.

3. The method of claim 1, wherein scanning the unknown files corresponding to the nonexistence signal in the file upload queue to obtain a risk coefficient for each of the unknown files corresponding to the nonexistence signal comprises:
calling multiple virus identification units of the client;
scanning each of the unknown files corresponding to the nonexistence signal in the file upload queue using the multiple virus identification units to obtain suspicious coefficients for each of the unknown files corresponding to the nonexistence signal; and
aggregating the suspicious coefficients for each of the unknown files corresponding to the nonexistence signal to obtain the risk coefficient for each of the unknown files corresponding to the nonexistence signal.

4. The method of claim 3, wherein aggregating the suspicious coefficients for each of the unknown files corresponding to the nonexistence signal to obtain the risk coefficient for each of the unknown files corresponding to the nonexistence signal further comprises:
   obtaining an identification capability for each of the multiple virus identification units, wherein the identification capability refers to an ability of the multiple virus identification units to identify virus; and
   factoring in the identification capability of each of the multiple virus identification units, aggregating the suspicious coefficients from the multiple virus identification units for each unknown file corresponding to the nonexistence signal to obtain the risk coefficient for each of the unknown file.

5. The method of claim 4, wherein aggregating the suspicious coefficients for each of the unknown file corresponding to the nonexistence signal to obtain the risk coefficient for each unknown file further comprises:
   selecting one or more virus identification units whose identification capability is above a threshold;
   aggregating the suspicious coefficients from the selected virus identification units with identification capability for each unknown file corresponding to the nonexistence signal to obtain the risk coefficient for each of the unknown file.

6. The method of claim 1, further comprising, after uploading the unknown files corresponding to the nonexistence signal in the file upload queue in order to a server,
   receiving an upload result returned from the server; and
   when the upload result indicates an upload failure, displaying a manual upload interface for receiving a selection made by an end-user at the manual upload interface to upload unknown files corresponding to the nonexistence signal that failed to upload to the server.

7. An apparatus for uploading files, comprising:
at least a hardware processor configured to execute:
insertion code instructions for upon receiving a scanning instruction, obtaining unknown files on a client and performing a preliminary filtering of the unknown files to obtain a file upload queue, including:
   obtaining attribute information of each of the unknown files, uploading only the attribute information of each of the unknown files to a server, and causing the server to determine whether there exists a file that matches the attribute information of each of the unknown files and to return a danger signal if such file exists, and a nonexistence signal if such file does not exist;
   upon receiving the danger signal from the server, removing unknown files corresponding to the danger signal from the client and removing the unknown files corresponding to the danger signal from the file upload queue; and
   upon receiving a nonexistence signal from the server, putting unknown files corresponding to the nonexistence signal in the file upload queue;
risk assessment code instructions for scanning the unknown files corresponding to the nonexistence signal in the file upload queue to obtain a risk coefficient for each of the unknown files corresponding to the nonexistence signal after the preliminary filtering is performed;
sorting code instructions for sorting in descending order the unknown files corresponding to the nonexistence signal in the file upload queue based on the risk coefficient of each of the unknown files corresponding to the nonexistence signal; and uploading code instructions for uploading the sorted unknown files in the file upload queue in order to the server;
wherein the apparatus further comprises: network detecting code instructions for,
   prior to the uploading code instructions for uploading the sorted unknown files in the file upload queue in order to the server, detecting a current network status;
   upon detecting that the current network status is abnormal, stopping uploading the sorted unknown files in the file upload queue, wherein abnormal network status indicates poor network connection including at least one of network packet loss and network delay; and
   upon detecting that the current network status is normal, executing the step of uploading the sorted unknown files in the file upload queue in order to a server.

8. The apparatus of claim 7, further comprising,
a construction module for, prior to the insertion module obtaining the file upload queue, constructing the file upload queue based on a number of the unknown files, wherein the file upload queue is configured to store unknown files to be uploaded to the server.

9. The apparatus of claim 7, wherein the risk assessment code instructions comprises:
calling code instructions for calling multiple virus identification units of the client;
suspicious coefficient acquisition code instructions for scanning each of the unknown files corresponding to the nonexistence signal in the file upload queue using the multiple virus identification units to obtain suspicious coefficients for each of the unknown files corresponding to the nonexistence signal; and
risk coefficient acquisition code instructions for aggregating the suspicious coefficients for each of the unknown files to obtain the risk coefficient for each of the unknown files corresponding to the nonexistence signal.

10. The apparatus of claim 7, further comprising,
output code instructions for, after the uploading code instructions upload the unknown files corresponding to the nonexistence signal in the file upload queue in order to a server, receiving an upload result returned from the server; and, when the upload result indicates an upload failure, outputting a manual upload interface for receiving a selection made by an end-user at the manual upload interface to upload unknown files corresponding to the nonexistence signal that failed to upload to the server.

11. A non-transitory computer-readable medium having stored thereon computer-executable instructions, said computer-executable instructions for performing a method for sorting files, the method comprising:
obtaining a plurality of files;
performing a preliminary filtering of the plurality of files to obtain a file upload queue, including:
   obtaining attribute information of each file of the plurality of files, uploading only the attribute information of each file of the plurality of files to a server, and causing the server to determine whether there exists a file that matches the attribute information of each file of the plurality of files and to return a danger signal if such file exists, and a nonexistence signal if such file does not exist;

upon receiving the danger signal from the server, removing files of the plurality of files corresponding to the danger signal from the client and removing the files corresponding to the danger signal from the file upload queue; and upon receiving a nonexistence signal from the server, putting files corresponding to the nonexistence signal in the file upload queue;

after the preliminary filtering is performed, generating a risk coefficient for each file corresponding to the nonexistence signal in the file upload queue indicating a level of threat each file may pose to a computer system; and sorting the files corresponding to the nonexistence signal in descending order based on the risk coefficient of the files;

uploading the sorted files corresponding to the nonexistence signal in the file upload queue in order to the server;

wherein prior to uploading the sorted files corresponding to the nonexistence signal in the file upload queue in order to a server, detecting a current network status;

upon detecting that the current network status is abnormal, stopping uploading the sorted files in the file upload queue, wherein abnormal network status indicates poor network connection including at least one of network packet loss and network delay; and upon detecting that the current network status is normal, executing the step of uploading the sorted files in the file upload queue in order to a server.

12. The computer-readable medium of claim 11 further comprises:
placing the files corresponding to the nonexistence signal in descending order of the risk coefficients of the files in a queue.

13. The computer-readable medium of claim 11 further comprises:
uploading the sorted files in descending order of the risk coefficients of the files to the server.

14. The computer-readable medium of claim 11, wherein the plurality of files are files not identified by a client.

* * * * *